(12) United States Patent
Amato et al.

(10) Patent No.: US 12,051,242 B2
(45) Date of Patent: Jul. 30, 2024

(54) SCANNING-BASED VIDEO ANALYSIS

(71) Applicant: Alarm.com Incorporated, Tysons, VA (US)

(72) Inventors: Ariel Amato, Barcelona (ES); Diego Antelo, Paraná (AR); Sergio Sancho Asencio, Barcelona (ES); Francesco Brughi, Barcelona (ES); Mathias Bertorelli Argibay, Barcelona (ES); Brent Boekestein, San Jose, CA (US)

(73) Assignee: Alarm.com Incorporated, Tysons, VA (US)

( * ) Notice: Subject to any disclaimer, the term of this patent is extended or adjusted under 35 U.S.C. 154(b) by 253 days.

(21) Appl. No.: 17/452,668

(22) Filed: Oct. 28, 2021

(65) Prior Publication Data

US 2023/0140505 A1    May 4, 2023

(51) Int. Cl.
| | |
|---|---|
| G06V 20/40 | (2022.01) |
| G06F 18/21 | (2023.01) |
| G06T 7/20 | (2017.01) |
| G06T 7/70 | (2017.01) |
| G06T 11/00 | (2006.01) |
| G06V 10/22 | (2022.01) |
| G06V 20/52 | (2022.01) |

(52) U.S. Cl.
CPC .............. *G06V 20/41* (2022.01); *G06F 18/21* (2023.01); *G06T 7/20* (2013.01); *G06T 7/70* (2017.01); *G06T 11/00* (2013.01); *G06V 10/225* (2022.01); *G06V 10/235* (2022.01); *G06V 20/52* (2022.01); *G06T 2200/24* (2013.01); *G06T 2207/10016* (2013.01); *G06T 2207/20081* (2013.01); *G06T 2207/20084* (2013.01); *G06T 2207/30196* (2013.01); *G06T 2207/30232* (2013.01); *G06T 2207/30242* (2013.01); *G06T 2207/30248* (2013.01)

(58) Field of Classification Search
None
See application file for complete search history.

(56) References Cited

U.S. PATENT DOCUMENTS

| 5,574,762 | A | * | 11/1996 | Sato .......................... G07C 9/00 |
|---|---|---|---|---|
| | | | | 377/6 |
| 7,675,655 | B2 | * | 3/2010 | Marshall ............... G06T 3/4038 |
| | | | | 382/104 |
| 9,305,216 | B1 | | 4/2016 | Mishra |
| 10,565,733 | B1 | | 2/2020 | Zhang et al. |
| 11,120,300 | B1 | | 9/2021 | Ramanathan et al. |
| 11,798,340 | B1 | * | 10/2023 | Xu .......................... G06V 20/41 |
| 2002/0028026 | A1 | * | 3/2002 | Chen ...................... H04N 5/782 |
| | | | | 382/284 |

(Continued)

OTHER PUBLICATIONS

Bradski, Gary, "The OpenCV Library," Dr. Dobb's Journal of Software Tools, Nov. 1, 2000, 5 pages.

(Continued)

*Primary Examiner* — Delomia L Gilliard
(74) *Attorney, Agent, or Firm* — Fish & Richardson P.C.

(57) ABSTRACT

Various embodiments described herein provide for analysis of a video using a scanning technique. According to some embodiments, a video is analyzed by scanning a region of interest in a series of frames of the video, and generating a composite image based on the pixels captured by the scanning operation.

20 Claims, 9 Drawing Sheets

(56) References Cited

U.S. PATENT DOCUMENTS

| | | | |
|---|---|---|---|
| 2003/0053659 A1* | 3/2003 | Pavlidis | G08B 13/19608 382/103 |
| 2003/0123703 A1* | 7/2003 | Pavlidis | G08B 13/19608 382/103 |
| 2006/0146377 A1* | 7/2006 | Marshall | G06T 3/4038 358/486 |
| 2006/0225352 A1* | 10/2006 | Fischer | G07C 9/257 49/49 |
| 2007/0040913 A1* | 2/2007 | Fisher | H04N 23/67 348/E5.042 |
| 2007/0040918 A1 | 2/2007 | Kondo et al. | |
| 2007/0052803 A1* | 3/2007 | Chosak | G08B 13/1968 348/E7.086 |
| 2007/0058717 A1* | 3/2007 | Chosak | G06T 7/246 375/240.26 |
| 2008/0317123 A1 | 12/2008 | Kim et al. | |
| 2009/0195382 A1* | 8/2009 | Hall | G08B 13/19663 340/541 |
| 2014/0036113 A1* | 2/2014 | Fisher | H04N 1/3876 348/240.99 |
| 2015/0043771 A1 | 2/2015 | Wu et al. | |
| 2016/0321888 A1* | 11/2016 | Chosak | G08B 13/19689 |
| 2016/0328827 A1* | 11/2016 | Ilic | G06T 3/4038 |
| 2016/0379079 A1* | 12/2016 | Han | G06V 20/52 382/190 |
| 2017/0185872 A1 | 6/2017 | Chakraborty | |
| 2017/0286774 A1 | 10/2017 | Gaidon | |
| 2018/0060653 A1* | 3/2018 | Zhang | G06V 20/52 |
| 2019/0114486 A1 | 4/2019 | Wang | |
| 2019/0246130 A1 | 8/2019 | Sheikh et al. | |
| 2019/0303684 A1* | 10/2019 | Khadloya | G07C 9/00896 |
| 2021/0027068 A1* | 1/2021 | Gayatri | H04N 7/188 |
| 2021/0374473 A1 | 12/2021 | Ramanathan et al. | |
| 2023/0046840 A1 | 2/2023 | Ramanathan et al. | |

OTHER PUBLICATIONS

Goodfellow et al., "Deep Learning," MIT Press, 2016, [retrieved on Feb. 9, 2023], retrieved from: URL<http://www.deeplearningbook.org>, 2 pages.

Guillou et al., "Using vanishing points for camera calibration and coarse 3D reconstruction from a single image," The Visual Computer, 2000, 16:396-410.

Klose, Bill, "What are differences between vehicle detection technologies," Machine Design, Sep. 20, 2017, [retrieved on Feb. 9, 2023], retrieved from: URL<https://www.machinedesign.com/mechanical-motion-systems/article/21835963/what-are-the-differences-between-vehicledetection-technologies>, 11 pages.

Orghidan et al., "Camera calibration using two or three vanishing points," Proceedings of the Federated Conference on Computer Science and Information Systems (FedCSIS), 2012, pp. 123-130.

Redmon et al., "YOLO9000: Better, Faster, stronger," Computer Vision Foundation, 2016, pp. 7263-7271.

Smith, Ray and Google Inc., "An Overview of the Tesseract OCR Engine," Proc. Ninth Int. Conference on Document Analysis and Recognition (ICDAR), IEEE Computer Society, 2007, pp. 629-633.

Zhi-Qiang et al., "Mean-Shift Tracking Algorithm with Improved Background-Weighted Histogram." 2014 Fifth International Conference on Intelligent Systems Design and Engineering Applications, IEEE, 2014, pp. 597-602.

Zhu et al., "A Review of Video Object Detection: Datasets, Metrics and Methods of video object detection; deep learning-based video object detection," Applied Sciences, Nov. 2020, 10:7834, 25 pages.

\* cited by examiner

SCANNING-BASED VIDEO ANALYSIS

TECHNICAL FIELD

The present disclosure relates generally to computer vision, and, more particularly, various embodiments described herein provide for systems, methods, techniques, instruction sequences, and devices for analysis of a video based on scanning.

BACKGROUND

Image processing has been exploited for decades, but the success of an image process application usually involves a controlled environment. The introduction and development of computer vision has overcome such limitations over the years. Nowadays the computer vision domain is making more use of machine learning (ML) techniques to improve results.

ML has evolved significantly over the years and, more recently, Artificial Deep Neural Networks (ADNNs) have become a dominant technology in the domain of machine learning (ML). Applications based on ADNNs, such as deep learning, can be able to learn a unique data representation of a given object to detect it in an unseen image (e.g., a single digital image or a digital video stream). Generally, designing an ML model (e.g., ADNN) for detecting an object within an image or a frame of a video involves the ML model learning descriptive features, which become a unique representation of the object in a manner that is robust to changes in the depicted scene (e.g., point of view, scale, illumination, partial occlusions, which can depend on the position and location of the digital image capture device).

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
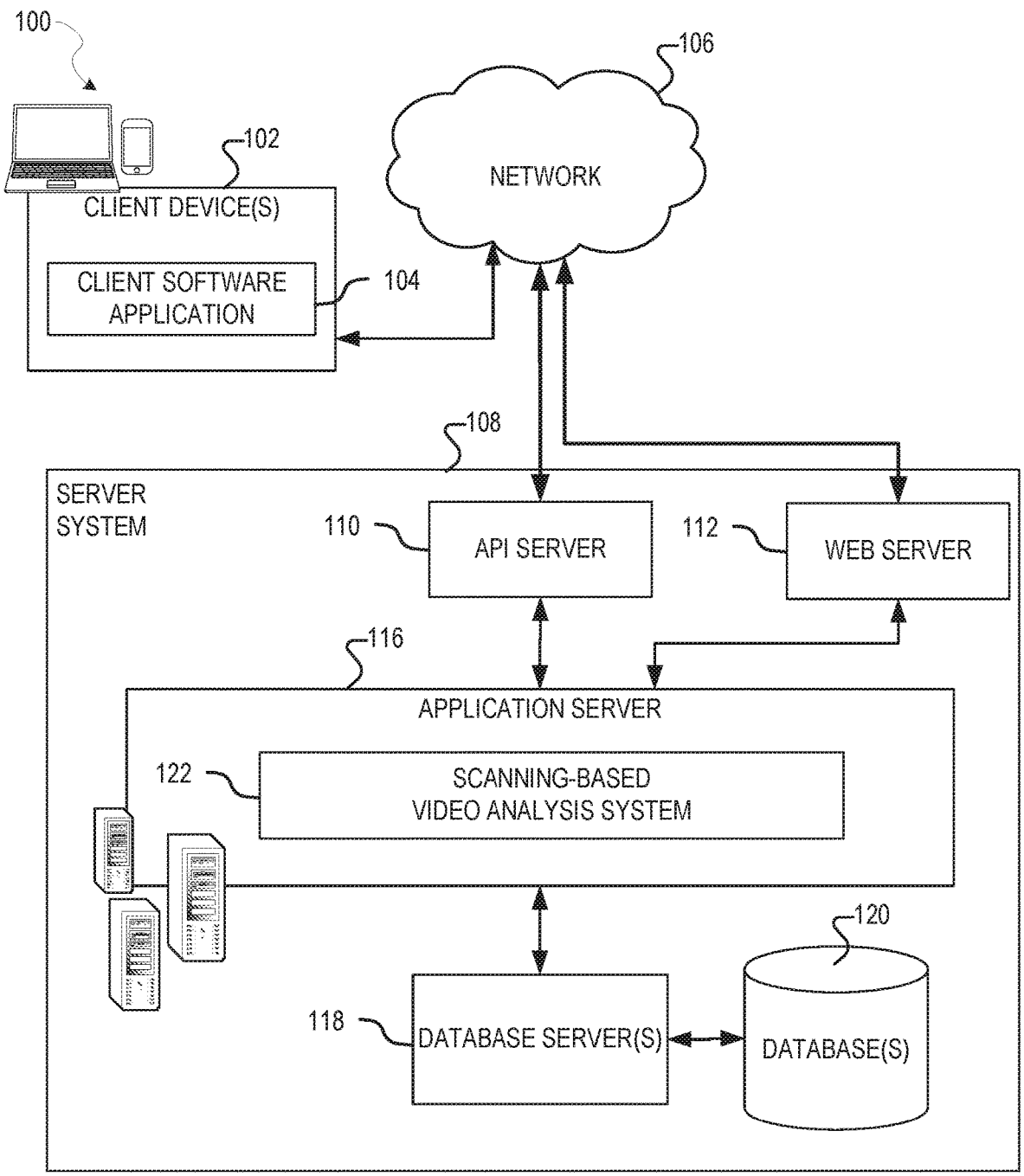
FIG. 1 is a block diagram showing an example data system that includes an scanning-based video analysis system, according to various embodiments of the present disclosure.

Traditionally, machine learning (ML) models, such as convolutional neural networks and classifiers, can be used to detect one or more moving objects within a video (e.g., video captured by a surveillance camera) and generate information regarding those moving objects. Generally, a traditional ML model for analyzing moving objects in a video is configured to process the video at or near the frame rate of the video (e.g., 30 frames per second (fps)) in order to generate real-time or near real-time analysis. As a consequence, such traditional ML models tend to be large, complex, and/or use a lot computational resources to operate. Additionally, traditional ML models for moving object analysis can be prone to errors that result in less than accurate analysis results, especially in such applications as counting moving objects or detecting moving objects that tailgate each other through a gated entryway. In the aforementioned use cases, the process includes a tracking system whose role is to match and correlate detections of each moving object in a given frame and find its corresponding one within consecutive frames. The task of tracking (and associate object detection through frames) is not trivial one, and can represent one of the most difficult computer vision challenges yet to be fully solved. Additionally, tracking has can be negatively impacted by moving object detection accuracy, the similarity between different moving objects depicted within a scene, and the proximity of moving objects.

Various embodiments described herein provide for analysis of a video using a scanning technique. In particular, according to some embodiments, a video is analyzed by scanning a region of interest in a series of frames of the video (e.g., frames between a start time and a stop time of the video), and generating a composite image based on the pixels captured by the scanning operation. For instance, pixels captured from the region of interest, over a period of time of the video, can be stitched or appended together to form a composite image. The composite image can be generated such that one dimension of the composite image matches one dimension of the region of interest (e.g., width of the composite image corresponds to the width of the region of interest), while the other dimension of the composite image (e.g., height of the composite image) is determined by length of time scanned from the video (e.g., the more time of the video scanned, the larger the height of the composite image). Accordingly, one dimension of the composite image can correspond to the range of time, while the other corresponds to a transformation of the X and Y coordinates of the image. In this way, a composite image can transpose a span of time of the video to a dimension of space (e.g., size of the composite image) with respect to a region of interest in the video. Examples of this are illustrated and described with respect to FIGS. 4 and 6.

The composite image generated can represent condensed spatial and historical information for moving objects depicted in the video. For example, the composite image can serve as a visual representation of such information as: a history of a region of interest for frames of a video over a period of time (e.g., from a start time to a stop time of a video); the order in which moving objects are depicted in the video; the speed at which moving objects are traveling as they pass through the video; the distance between moving objects depicted in the video. Accordingly, the composite image can serve as a visualization of moving objects depicted in the video. According various embodiments, a given moving object is only depicted one time in the composite image, thereby providing moving object analysis without need for tracking. Additionally, given its ability to represent condensed information for moving objects depicted in the video, with respect to at least the region of interest (from which the composite image was generated), the composite image can serve as a lightweight version of the video that can be used in place of the video for analysis purposes (e.g., ML model processing), storage purposes (e.g., historical or archival purposes), or communication purposes (e.g., communicate the composite image in place of the video).

A scanning operation of an embodiment can be performed for a period of time that is less than the entire duration of the video (e.g., for a 5 minute video, scanning operation can be perform from time 01:05 to time 01:25). Additionally, for some embodiments, the scanning operation is performed at or near the native speed (e.g., frame rate) of the video. For instance, for a video having a frame rate of 30 fps, a scanning operation of an embodiments can comprise capturing pixels from a region of interest in 30 consecutive frames for each second of the video scanned.

By using a composite image as described herein, various embodiments can improve a computing device's ability to detect one or more moving objects depicted within the video (e.g., a video stream), which can improve analysis of the moving objects within the video for certain applications (e.g., visual domain applications) when compared to traditional methodologies (e.g., using a ML model to directly process video or count moving objects). For instance, an embodiment can improve detection and analysis of moving objects within a video for such applications as: counting moving objects passing through a path (e.g., entryway, passageway, or roadway, which may or may not be gated) depicted in a video; throughput of moving objects passing through a path depicted in a video; determining or inferring speed of moving objects depicted in a video; detecting unauthorized access of a gated (or controlled) path depicted in a video; and detecting moving objects that tailgate each other through a gated (or controlled) path depicted in a video. Additionally, applications can display the composite image as a visual representation of moving object that have passed through a region of interest within a video (e.g., application presents the composite image through a client interface to enable quick user review), or can use it as a lightweight data option for capturing one or more regions of interest within a video. For instance, as a lightweight data option, a copy of the composite image can be stored in place of the video for historical or archival purposes, or a copy of the composite image can be communicated as payload over a network in place of the video.

According to some embodiments, a composite image generated from a region of interest in a series of frames in a video is processed by a computer vision technique (e.g., one that uses a machine learning (ML) model) to detect one or more moving objects within the video, which can facilitate certain analysis features, such as counting moving objects, detecting authorized and unauthorized passage (e.g., through a gated or controlled entryway) by moving objects, and the like. For various embodiments, the composite image is processed by the computer vision technique in place of using the video, which can obviate the need to generate or use a ML model capable of processing the video. For instance, compared to a traditional ML model configured (e.g., trained) to process a video for moving objects (e.g., ML model configured to process video at 30 fps to detect moving objects), a comparable ML model configured (e.g., trained) to process composite images as described herein can be less complex, smaller in data size, consume less computing resources, or some combination thereof while achieving similar or better results than the video-based ML model. For instance, for an example 5 minute video, the inference performed by the comparable ML, model would be based on a single compose image (which can represent a single frame formed by several frames of the 5 minute video), while the traditional ML model would need to process (5*60*25)= 7500 frames of the 5 minute video. Additionally, an embodiment described herein can achieve detection of a moving object through use of a single ML based detector. Accordingly, the comparable ML model can be considered more lightweight than the ML model configured for video and, as such, easier to deploy on low-powered computing devices, such as edge computing devices within a network computing environment. For instance, a ML model configured to process composite images, for video captured (e.g., generated or provided) by a digital surveillance camera, can be deployed and operate on the digital surveillance camera itself, or on an edge computing device operatively coupled (e.g., over a local network connection) to the digital surveillance camera. Such would likely not be possible for a traditional ML model configured to process video captured by the digital surveillance camera, especially at or near real time. With respect to a lower-quality digital image capture device, a ML model configured to process composite images, generated based on video from the lower-quality digital image capture device, can detect moving objects in the video better than a traditional ML model configured to process video from the lower-quality digital image capture device. As alternative to using a ML model, a computer vision technique for detecting one or more moving objects in a composite image can comprise a motion detection algorithm, such as background subtraction or temporal differencing, which can identify moving objects in the composite image.

As used herein, a video (or digital video) can comprise a digital video stream, such as one that is streamed live, or stored digital video, such as archived digital video.

Image data can comprise a digital image or one or more frames from a video. For various embodiments described herein, a video is captured by a digital image capture device, such as a video camera, or a surveillance camera. Over a span of time, a video can depict one or more moving objects that pass through a point of view of a digital image capture device. Examples of moving objects depicted in a video can include, without limitation, human individuals, animals, cars, trucks, motorcycles, recreational vehicles (RVs), airplanes, helicopters, and the like. In an industrial context or use case, examples of moving objects can include, without limitation, items or products passing through a production line or traveling on a conveyer belt.

As used herein, a path can include an entryway, a passageway, or a roadway, which may or may not be controlled or gated for authorized passage. A gate can include a gate mechanism or a door, which can be controlled by an authorization mechanism, such as a badge access system. A machine learning (ML) model can comprise any predictive model that is generated based on (or that is trained on)

training data. Once generated/trained, a machine learning model can receive a composite image (as described herein) and generate an output for the inputs based on the model's training. Different types of machine learning models can include, without limitation, ones trained using supervised learning, unsupervised learning, reinforcement learning, or deep learning (e.g., complex neural networks).

The description that follows includes systems, methods, techniques, instruction sequences, and devices that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes a scanning-based video analysis system, according to various embodiments of the present disclosure. By including the scanning-based video analysis system 122, the data system 100 can facilitate analysis of a video using scanning technique as described herein, which in turn can enable analysis of moving objects within the video. For instance, the scanning-based video analysis system 122 can enable a user at a client device (e.g., 102) to select a video to analyze, select a region of interest of the video to scan, select a time span of the video to scan; scanning of the region of interest of the video, cause the display, storage, or communication of a composite image generated by scanning of the region of interest of the video. The scanning-based video analysis system 122 scan the region of interest of the video and generate the composite image, can process the composite image by a computer vision technique for detecting objects, and can generate analysis (e.g., count of moving objects, throughput of a path, detect unauthorized passage, etc.) based on results (e.g., detection results) generated by the ML model. In addition, the scanning-based video analysis system 122 can transform detection from the scanning-based space (e.g., based on the composite image) to the video space to enhance the human visualization.

As shown, the data system 100 includes one or more client devices 102, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via the network 106.

The server system 108 provides server-side functionality via the network 106 to the client software application 104. While certain functions of the data system 100 are described herein as being performed by the scanning-based video analysis system 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104 where the client device 102 executes one or more operations for analyzing a video using a scanning approach as described herein.

The server system 108 supports various services and operations that are provided to the client software application 104 by the scanning-based video analysis system 122. Such operations include transmitting data from the scanning-based video analysis system 122 to the client software application 104, receiving data from the client software application 104 to the scanning-based video analysis system 122, and the scanning-based video analysis system 122 processing data generated by the client software application 104. This data may include for example, requests and responses relating to: selecting a video to analyze; selecting a region of interest of the video to scan; selecting a time span of the video to scan; scanning of the region of interest of the video; viewing, storing, or communicating a composite image generated by scanning of the region of interest; processing the composite image by a ML model (e.g., for detecting moving objects); and generating analysis based on results (e.g., detection results) generated by the ML model. Data exchanges within the data system 100 may be invoked and controlled through operations of software component environments available via one or more endpoints, or functions available via one or more user interfaces of the client software application 104, which may include web-based user interfaces provided by the server system 108 for presentation at the client device 102.

With respect to the server system 108, each of an Application Program Interface (API) server 110 and a web server 112 is coupled to an application server 116, which hosts the scanning-based video analysis system 122. The application server 116 is communicatively coupled to a database server 118, which facilitates access to a database 120 that stores data associated with the application server 116, including data that may be generated or used by the scanning-based video analysis system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functionality of the scanning-based video analysis system 122 of the application server 116.

The application server 116 hosts a number of applications and subsystems, including the scanning-based video analysis system 122, which supports various functions and services with respect to various embodiments described herein.

The application server 116 is communicatively coupled to a database server 118, which facilitates access to database(s) 120 in which may be stored data associated with the scanning-based video analysis system 122. Data associated with the scanning-based video analysis system 122 can include, without limitation, one or more settings (or parameters) for a scan operation (e.g., data describing parameters of a region of interest with respect to video from a specific digital image capture device), one or more parameters (e.g., original frame rate, resolution, etc.) to transform the detection (based on the composite image) back to the video space, video data for one or more videos (or video streams) captured by a digital image capture device, one or more composite images generated by scanning operations, and data (e.g., model data or training data) for (ML) models trained to process composite images, results from processing one or more composite images by a ML model, and analysis data generated based on results provided by a MI model.

Figure 2:
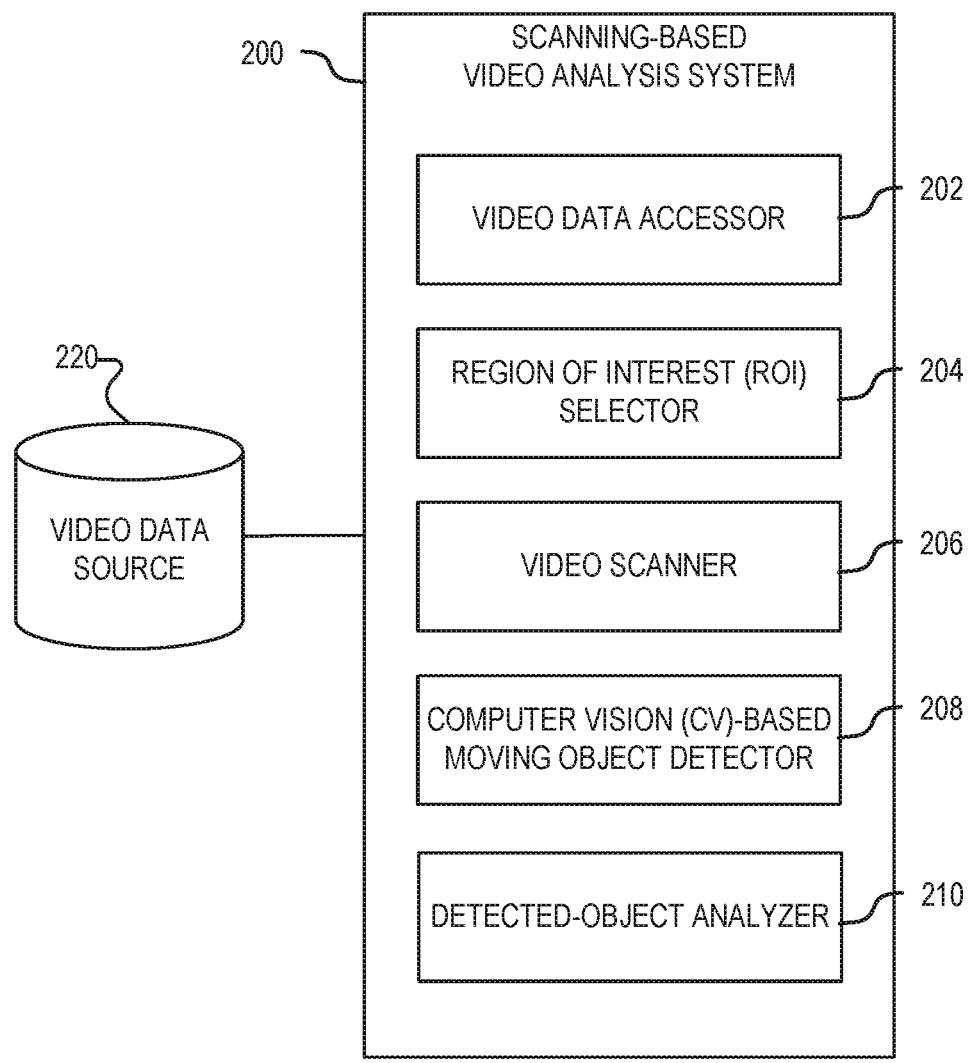
FIG. 2 is a block diagram illustrating an example system for analysis of a video using scanning, according to various embodiments of the present disclosure.

FIG. 2 is a block diagram illustrating an example scanning-based video analysis system 200 for analysis of a video using scanning (e.g., scanning-space transformation) and a computer vision technique (e.g., using machine learning), according to various embodiments of the present disclosure. As shown, the scanning-based video analysis system 200 is communicatively coupled to a video data source 220, and comprises a video data accessor 202, a region of interest (ROI) selector 204, a video scanner 206, a computer vision (CV)-based moving object detector 208, and a detected-object analyzer. Depending on the embodiment, the scanning-based video analysis system 200 can be implemented (at least in part) by a machine similar to the one described below with respect to FIG. 9, and can use a software architecture similar to the one described below with respect to FIG. 8. For various embodiments, the components and arrangement of components may vary from what is illustrated in FIG. 2. A user at a client device (e.g., 102) can access the scanning-based video analysis system 200 (e.g., via a graphical user interface presented on a software application on the client device 102) and use the scanning-based video analysis system 200 to analyze an individual video or one or more videos captured (e.g., generated or provided) by a specific digital image capture device.

The video data source 220 comprises a data source (e.g., database) to store, and provide the scanning-based video analysis system 200 with, video data that can be processed by the scanning-based video analysis system 200 for moving object detection and analysis. The video data can be generated by a digital image capture device, such as a digital surveillance camera (e.g., digital security camera), which may be deployed in an indoor or outdoor environment. As used herein, the video data, can be for one or more individual videos or a video stream (e.g., that is being captured and continuously provided by a digital image capture device).

The video data accessor 202 is configured to access video data (e.g., from the video data source 220) generated by a digital image capture device, such as a digital surveillance camera, where the video data comprises a series of frames of video captured by the digital image capture device.

The ROI selector 204 is configured to define or specify a region of interest (ROI) within frames provided by the video data. Depending on the embodiment, the ROI can be defined or specified for (e.g., in association with) one or more individual videos, or for (e.g., in association with) any video provided by a specific digital image capture device, such as a digital surveillance camera installed to monitor a specific path (e.g., entryway, passageway, or roadway), various embodiments, the ROI is defined (or specified) by a user through a user interface (e.g., graphical user interface presented via a web interface). The ROT can vary in shape, size, and dimension. For instance, the ROI can be defined as a line or a vector. Depending on the application, the ROI can be positioned within each frame relative to a gate (e.g., for an entryway, passageway, or roadway) depicted in the video.

The ROI selector 204 can enable a user can select (e.g., specify or configure), for scanning, a region of interest (ROI) (e.g., section or area) within frames of an individual video, or a region of interest within frames of video (e.g., all video) captured (e.g., generated or provided) by a specific digital image capture device, such as a specific surveillance camera installed outside a building or relative to a gated or controlled path (e.g., gated path for people or a vehicle, such as a toll station for a motor vehicle). For example, the specific digital image capture device can be stationary and positioned such that the specific digital image capture device captures video with respect to a specific point of view of the specific digital image capture device (e.g., point of view of the entryway being monitored or surveilled).

For various embodiments, the selection of a region of interest in frames of a video comprises selecting (e.g., via the ROI selector 204) one or more parameters of the region of interest. The parameters can include, without limitation, a shape (e.g., a single line, circle, quadrilateral, etc.), size (e.g., dimensions), or position (e.g., X and Y coordinates within a frame) of the region of interest. Where the region of interest comprises a single line, the region of interest can be referred to as a scan line. Additionally, the selection of a region of interest (in frames of a video) can comprise selecting one or more parameters of the region of interest with respect to a representative frame of the video, where the representative frame can comprise a blank frame or an example frame sampled from the video. Depending on the embodiment, via a graphical user interface, a user can select the representative frame by drawing the region of interest on the representative frame, or highlighting an area of the representative frame that is to represent the region of interest. For example, a user can draw a single line across a representative frame (e.g., a single line relative to an entryway depicted in the representative frame).

Once the region of interest is selected, a scanning operation by the video scanner 206 can capture, from each frame in a series of frames of the video, pixels that fall within or overlap with the region of interest, where the series of frames can correspond to a span of time (e.g., a start and a stop time) on the video's timeline. Where the video comprises a video stream (e.g., that is being captured live or in real-time), pixels that fall within the region of interest can be captured from each new frame provides via the video stream. For some embodiments, after a selection of a region of interest is configured with respect to videos captured (e.g., a video stream generated) by a specific digital image capture device, the ROI selector 204 can save such that any future video captured by the specific digital image capture device will be scanned using the saved selection. Additionally, for some embodiments, more than one region of interest can be selected with respect to a specific video, or with respect to videos captured by a specific digital image capture device, where each region of interest can result in a separate scanning operation, which can result in generation of a separate composite image for each region of interest.

The video scanner 206 is configured to scan the ROI by capturing pixels from a region of interest in each frame in the series of frames, and generating a composite image based on the pixels. According to some embodiments, the composite image is generated by a collection of pixels lines coming from different frames based on the region of interest. In doing so, the scanning process facilitates transformation of moving objects that cross through the region of interest (e.g., the scan line) as a single object representation in the composite image. As a result, the motions of an object can be condensed and can be represented as a single object in an image. For some embodiments, the scanning process (e.g., capturing of pixel and generation of the composite image) is performed at or near the native speed (e.g., frame rate) of the video. For instance, for a video having a frame rate of 30 fps, the scanning can operate at a rate of 30 consecutive frames for each second of the video scanned. According to some embodiments, generation of the composite image based on the (captured) pixels comprises appending (or stitching) the pixels together according to an order in which the pixels are captured from the series of frames over a range of time. For some embodiments, the series of frames corresponds to a range of time (e.g., from a start time to a stop time) on a video or a video stream's timeline, and a dimension (e.g., length or width) of the composite image that is generated corresponds to that range of time. Examples of this are illustrated and described with respect to FIGS. 4 and 6.

For some embodiments, the scanning-based video analysis system 200 (or some other system) causes the composite image to display on a client device on a client interface, such as a graphical user interface. Based on the condensed spatial and historical information visually represented by the composite image, a user can use the displayed composite image as a quick and simple option for reviewing a portion of a video or video stream represented by the composite image (e.g., reviewing a count of moving objects, relative speed of moving objects, history of moving objects captured by a digital image capture device, etc.). For instance, to facilitate fast review of a region of interest of a video, a user can review the composite image generated in association with the region of interest, where representation of each moving object is condensed in a single image. To improve (e.g., clean-up) human-readability of the composite image, the composite image can be modified to address fisheye or warped depictions of moving objects within the composite image. Additionally, or alternatively, the composite image can be transformed from the image plane to the video space by using a detection position of each moving object in the composite image to extract a unique instance (e.g., copy) of each moving object from the video space. Additionally, or alternatively, the scanning-based video analysis system 200 (or some other system) causes storage of the composite image as historical data for the video. The composite image can represent a lightweight representation of the ROI in the video, which can be stored in place of the video for historical or archival purposes. Similarly, as a lightweight representation of the ROI in the video, the composite image can be used for communication purposes (e.g., communicating the composite image in place of the video when sharing the video with another user at another computer device).

The CV-based moving object detector 208 is configured to process a composite image by a computer vision technique, such as one using a machine learning (ML) model, to detect one or more moving objects (e.g., human individuals vehicles) in the composite image. According to some embodiments, the ML model of the computer vision technique is trained to detect one or more moving objects within composite images generated as described herein. A given ML model can be trained with respect to composite images generated from videos from different sources (e.g., captured by different digital image capture devices that may have different points of view) or with respect to a specific source (e.g., captured by a specific by different digital image capture device that has a specific point of view). In this way, the ML model can be configured to operate as a ML-based detector for detecting moving objects within an image.

Depending on the embodiment, the ML model comprises a convolutional neural network (CNN). For some embodiments, training the ML, model comprises generating (e.g., transforming and creating) composite images from one or more videos, and training the ML model using the generated composite images and label data (e.g., describing human-provided labels).

Additionally, for some embodiments, the ML model is trained based on training data generated using a three-dimensional (3D) rendering framework, which can speed up the training process. For instance, one could use a software or hardware 3D rendering framework that generates an animation of 3D moving objects moving, such as people or vehicles, moving through an environment (e.g., such an environment have a similar point of view as a digital image capture device of interest). From the animation, a composite image can be generated as described herein, and that composite image can be used as training data for the ML model. The ML model can have a data size that enables the ML model to be deployed on a device having low compute power or limited computing resources, such as an edge computing device in a network computing environment. Additionally, the processing of composite images by the ML model can performed as part of a batch process (e.g., performed according to a predetermined interval, such as every 3 seconds), where multiple composite images (e.g., generated from a same video or from different videos) are processed by the ML model as a batch.

The detected-object analyzer 210 is configured to use one or more detection results (e.g., from the CV-based moving object detector 208) to perform analysis of one or more moving objects depicted in the composite image, where the depicted moving objects represent those that passed through the region of interest. According to some embodiments, the detected-object analyzer 210 determines a count of moving objects passing through the ROI based on one or more moving objects detected by the CV-based moving object detector 208. For some embodiments, a dimension of an individual moving object, on the composite image, infers speed of the individual moving object (e.g., based on the time it takes the moving object to pass through the ROI), where the individual moving object is one included by the one or more moving objects detected (e.g., by the CV-based moving object detector 208) in the composite image. The dimension of the individual moving object inferring speed can be parallel with the dimension of the composite image that corresponds with a range of time covered by the composite image. For instance, where the height of a composite image corresponds with a range of time of a video, a height of a moving object (e.g., person or vehicle) depicted in the composite image can infer speed of that moving object based on the time it takes the moving object to pass through the ROI, and the inferred speed can be relative to one or more other moving objects depicted in the composite image. For example, where two moving vehicles are depicted in the composite image, the moving vehicle depicted with a larger (e.g., more stretched) height could be regarded as moving slower than the other moving vehicle that has a smaller (e.g., more condensed) height. Such an example is illustrated and described with respect to FIG. 4. Additionally, to infer the speed of a given moving object in the composite image with a high level of accuracy, an embodiment can use the dimension (e.g., height) of the given moving object in the composite image as an indication of the speed of the given moving object, and combine that information with the distance (e.g., in pixels) between the given moving object and another moving object in the composite image and with the dimension (e.g., height) of the other moving object.

For some embodiments, the detected-object analyzer 210 receives or access one or more signals or external system information; and based on the received signals or external system information and one or more moving objects detected by the CV-based moving object detector 208, the detected-object analyzer 210 determines if and when a first moving object (of the one or more moving objects) gains unauthorized passage through a path by following a second moving object (of the one or more moving objects) through the path. For instance, the ROI is positioned within each frame of the video relative to a gate system (e.g., for a gated path) depicted in the video. The detected-object analyzer 210 can access or receive system information from the gate system, where the system information describes at least one of when the gate system is open or when the gate system is closed at a given time (e.g., open or closed at a specific timestamp). Based on the gate system information and the detection of one or more moving objects by the CV-based moving object detector 208, the detected-object analyzer 210 can determine if and when a first moving object, such as a first human individual or vehicle, gains unauthorized passage through the gate system by following (e.g., closely behind) a second moving object, such as a second human individual or vehicle, through the gated system. This can also be referred to as detection of tailgating or tailgaters through a gated entryway, passageway, or roadway. According to some embodiments, the accessing or receiving of signals or external system information is optional for determining whether if and when a first moving object gains unauthorized passage through a path by following (e.g., closely behind) a second moving object through the path.

Figure 3:
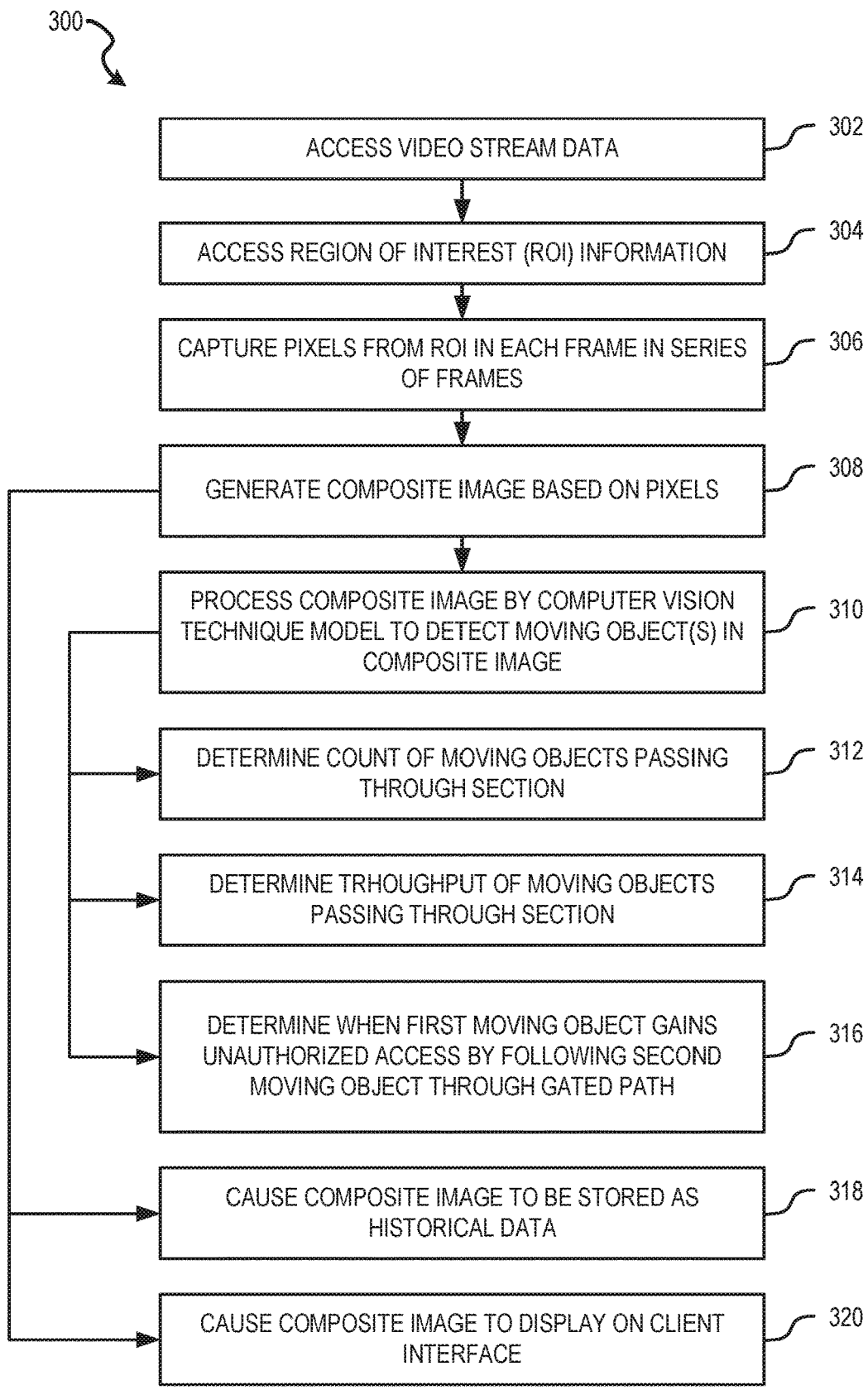
FIG. 3 is a flow diagram illustrating an example method for analysis of a video using scanning, according to various embodiments of the present disclosure.

FIG. 3 is a flowchart illustrating an example method 300 for analysis of a video based on scanning, according to various embodiments of the present disclosure. For some embodiments, the method 300 is performed, at least in part, by a system such as the scanning-based video analysis system 122 or the scanning-based video analysis system 200 described above with respect to FIGS. 1 and 2 respectively. An operation of the method 300 (or another method described herein) may be performed by a hardware processor (e.g., a central processing unit or graphics processing unit) of a computing device (e.g., a desktop, server, laptop, mobile phone, tablet, etc.), which may be part of a computing system based on a cloud architecture.

At operation 302, one or more hardware processors access video data generated by a digital image capture device, where the video data comprises a series of frames of video captured by the digital image capture device. Continuing with operation 304, the one or more hardware processors access a region of interest (ROI) information, which can define or specify a region of interest (ROI) with respect to the video. Thereafter, at operation 306, the one or more hardware processors capture pixels from the region of interest in each frame in the series of frames. At operation 308, the one or more hardware processors generate a composite image based on the pixels captured by operation 306. From operation 308, the method 300 can continue to one or more of operations 310, 318 or 320.

With respect to operation 310, the one or more hardware processors process the composite image by a computer vision technique to detect one or more moving objects in the composite image. Depending on the embodiment, the computer vision technique can comprise a ML model trained configured to process composite images, or can comprise a motion detection algorithm, such as background subtraction or temporal differencing. From operation 310, the method 300 can continue to one or more of operations 312, 314, or 316. At operation 312, the one or more hardware processors determine a count of moving objects passing through the region of interest based on the one or more moving objects detected by operation 310. At operation 314, the one or more hardware processors determine a throughput of moving objects passing through the region of interest based on the one or more moving objects detected by operation 310. Additionally, at operation 316, the one or more hardware processors determine when a first moving object (of the one or more moving objects) gains unauthorized passage through a gated path by following a second moving object (of the one or more moving objects) through the gated path.

At operation 318, the one or more hardware processors causes the composite image (generated by operation 308) to be stored as historical data or archival data associated with the video. Alternatively, or additionally, at operation 320, the one or more hardware processors causes the composite image to display on a client device (e.g., client device 102) on a client interface (e.g., graphical user interface).

Figure 4:
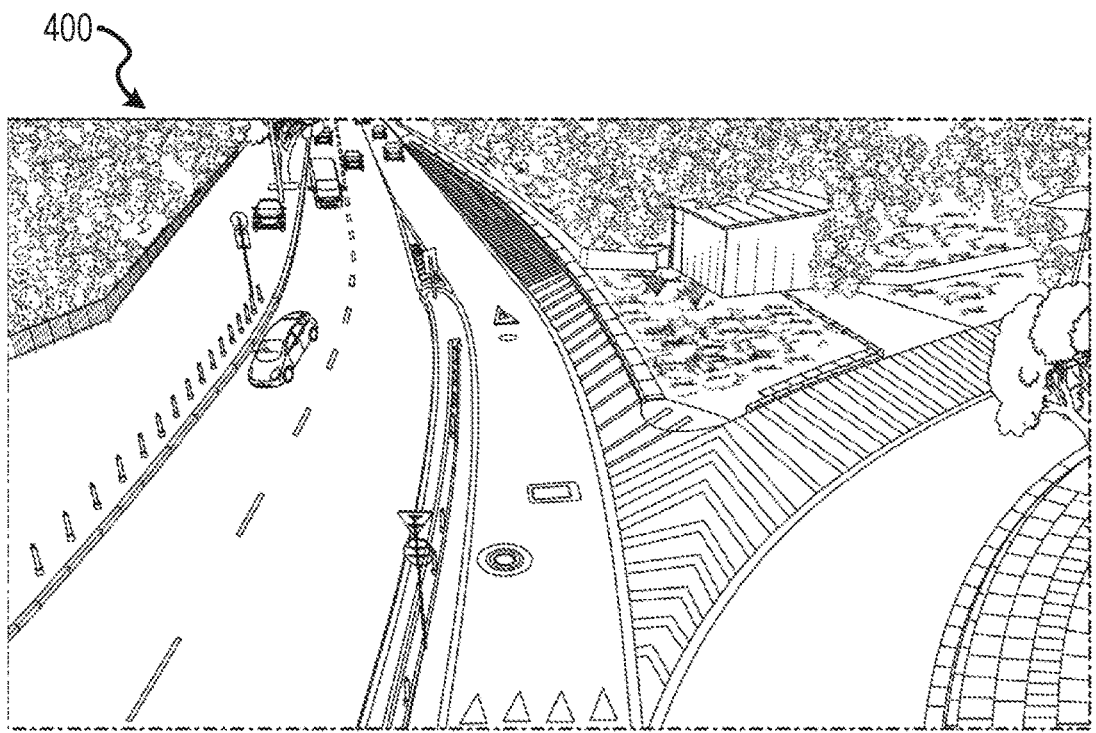
FIG. 4 illustrates an example of selecting a region of interest in frames of a video for scanning, according to various embodiments of the present disclosure.
Figure 4:
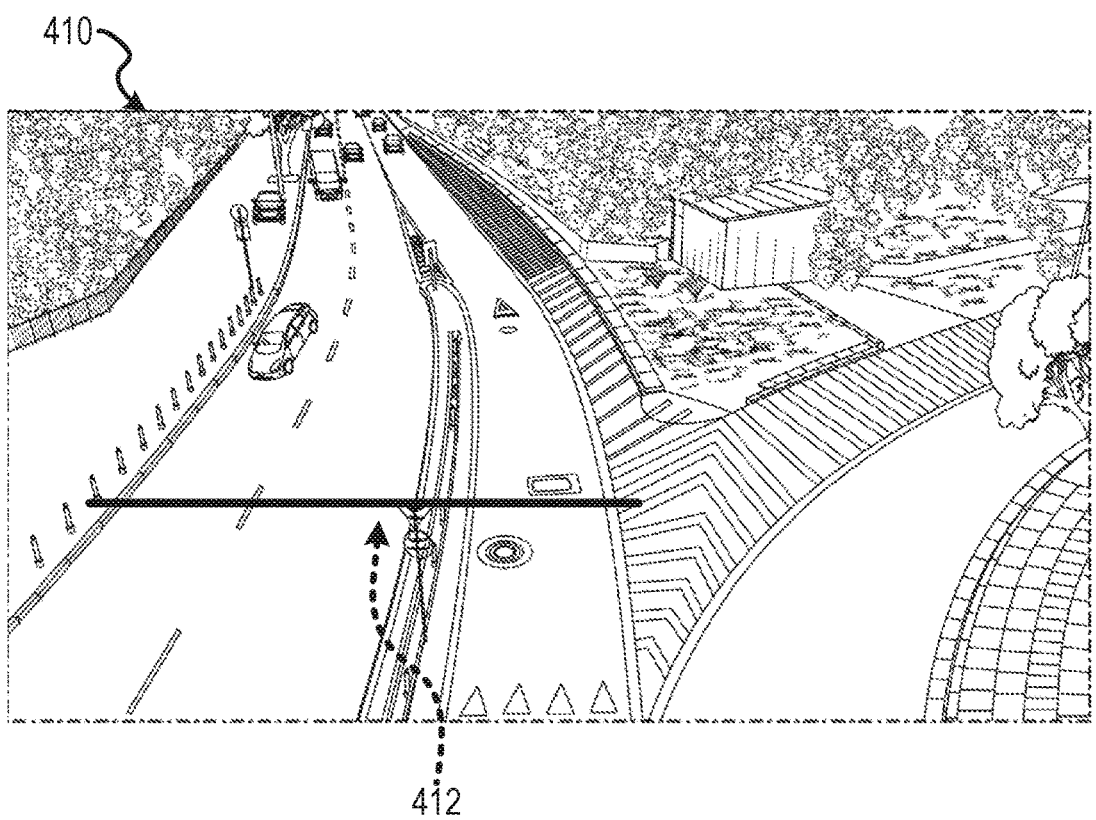

FIG. 4 is an example frame 400 from a video captured by an example digital image capture device, according to some example embodiments. The example frame 400 illustrates a point of view provided by the example digital image captured device. Based on the point of view shown, the example digital image captured device can capture video with respect to a multi-lane roadway, on which one or more vehicles can travel. The example frame 400 can be used by a user to select a region of interest (ROI) with respect to the point of view provided by the example digital image captured device. For instance, a user can draw a line 412 (almost horizontal line) on a portion of frame 410. The line 412 can be drawn across the frame 410, for example, via a graphical user interface displayed on a client device. According to various embodiments, the selected ROI can facilitate generation of one or more composite images from one or more videos generated by the example digital image capture device.

Figure 5:
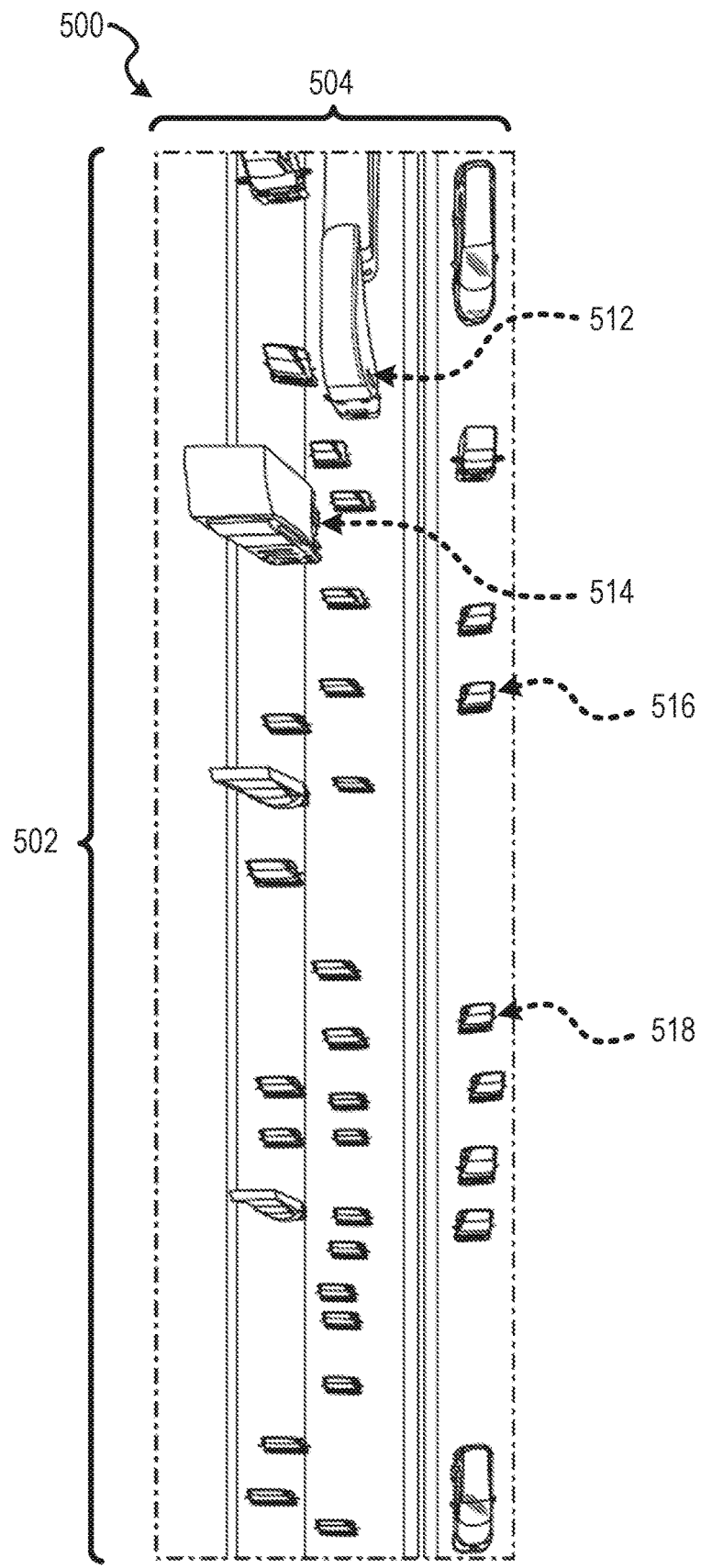
FIG. 5 provides an example of a composite image generated by various embodiments of the present disclosure.

FIG. 5 is an example composite image 500 generated from the region of interest, according to some example embodiments. As shown, the composite image 500 includes multiple vehicles as they passed through the region of interest over a span of time of a video captured from the point of view presented by frame 410. For some embodiments, the width 504 of the composite image 500 corresponds with the width of the region of interest defined by the line 412. Additionally, for some embodiments, the height 502 of the composite image 500 corresponds with the span of time of the video scanned using the region of interest. In this way, the height 502 of the composite image 500 can be used as a measure of time. The size (e.g., height) of a vehicle depicted in the composite image 500 can infer a speed of the vehicle (e.g., relative speed in comparison to other vehicles depicted in the composite image 500) based on the time it takes the vehicle to pass through the ROI. For instance, the height of vehicle 512 is shown to be larger than the height of vehicle 514. According to some embodiments, this difference in height can be an indication that vehicle 512 was moving slower through the region of interest than vehicle 514. Additionally, the space between two vehicles depicted (e.g., vehicles 516 and 518) in the composite image 500 can infer a distance between the vehicles.

Figure 6:
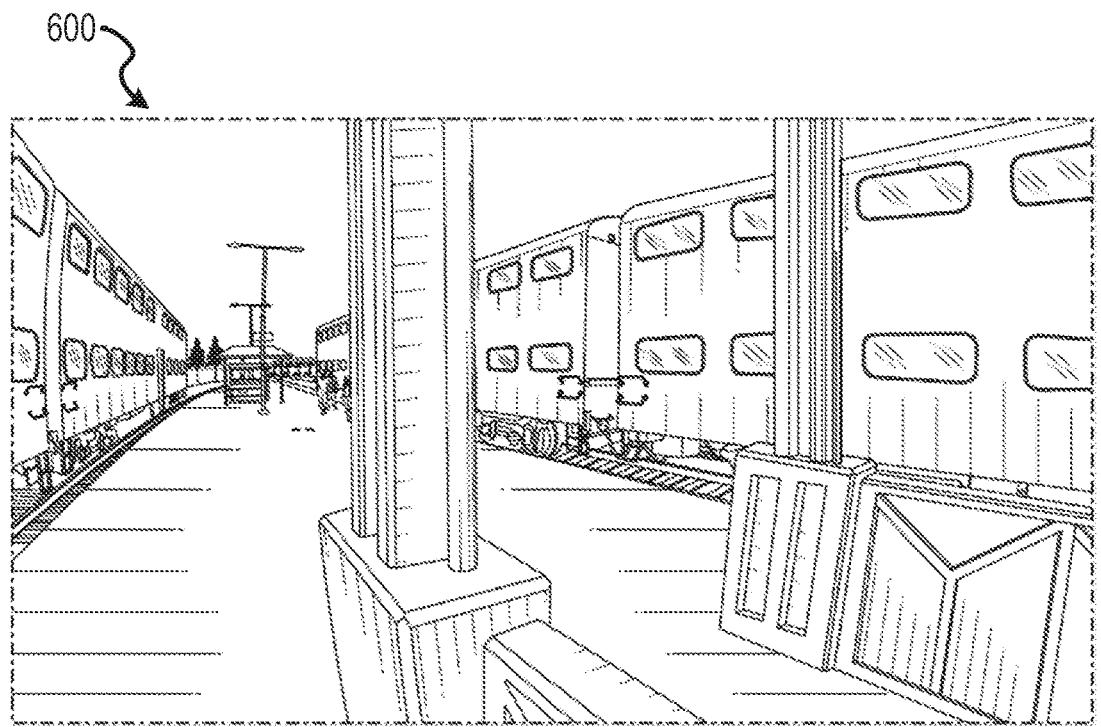
FIG. 6 illustrates an example of selecting a region of interest in frames of a video for scanning, according to various embodiments of the present disclosure.
Figure 6:
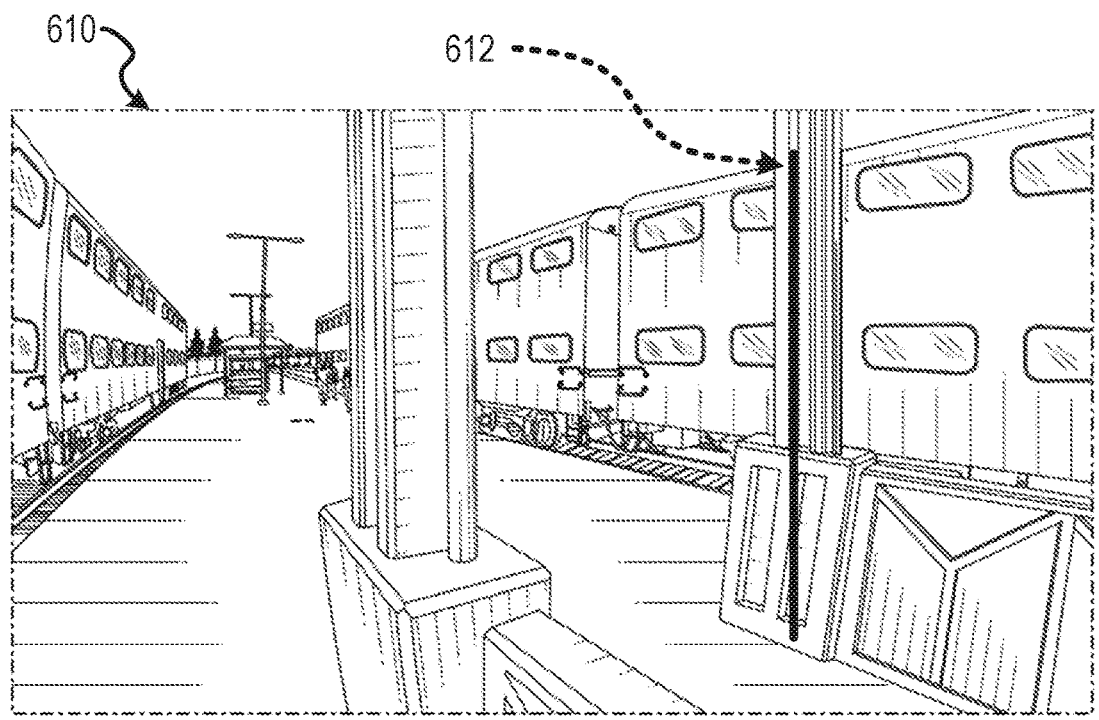

FIG. 6 is an example frame 600 from a video captured by an example digital image capture device, according to some example embodiments. The example frame 600 illustrates a point of view provided by the example digital image captured device. Based on the point of view shown, the example digital image captured device can capture video with respect to a train station platform, on which one or more passengers can board and depart trains. The example frame 600 can be used by a user to select a ROI with respect to the point of view provided by the example digital image captured device. For instance, a user can draw a vertical line 612 on a portion of frame 610. The vertical line 612 can be drawn across the frame 610, for example, via a graphical user interface displayed on a client device. According to various embodiments, the selected ROI can facilitate generation of one or more composite images from one or more videos generated by the example digital image capture device.

Figure 7:
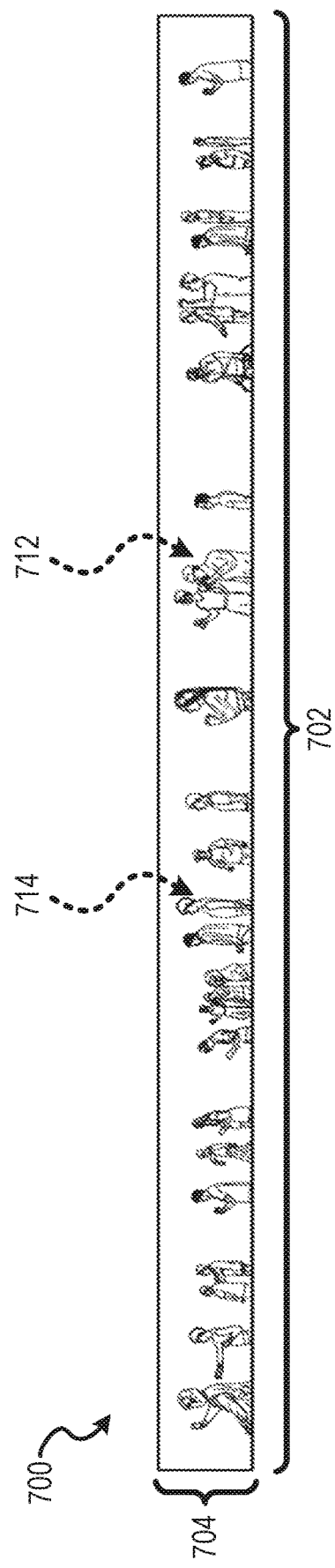
FIG. 7 provides an example of a composite image generated by various embodiments of the present disclosure.

FIG. 7 is an example composite image 700 generated from the region of interest, according to some example embodiments. As shown, the composite image 700 includes multiple vehicles as they passed through the region of interest over a span of time of a video captured from the point of view presented by frame 610. For some embodiments, the height 704 of the composite image 700 corresponds with the height of the region of interest defined by the vertical line 612. Additionally, for some embodiments, the width 702 of the composite image 700 corresponds with the span of time of the video scanned using the region of interest. In this way, the width 702 of the composite image 700 can be used as a measure of time. The size (e.g., width) of a vehicle depicted in the composite image 700 can infer a speed of the individuals (e.g., relative speed in comparison to other individuals depicted in the composite image 700) based on the time it takes the individual to pass through the ROI. For instance, the width of individual 712 is shown to be larger than the height of individual 714. According to some embodiments, this difference in width can be an indication that individual 712 was moving slower through the region of interest than individual 714. Additionally, the space between two individuals depicted in the composite image 700 can infer a distance between the vehicles.

Figure 8:
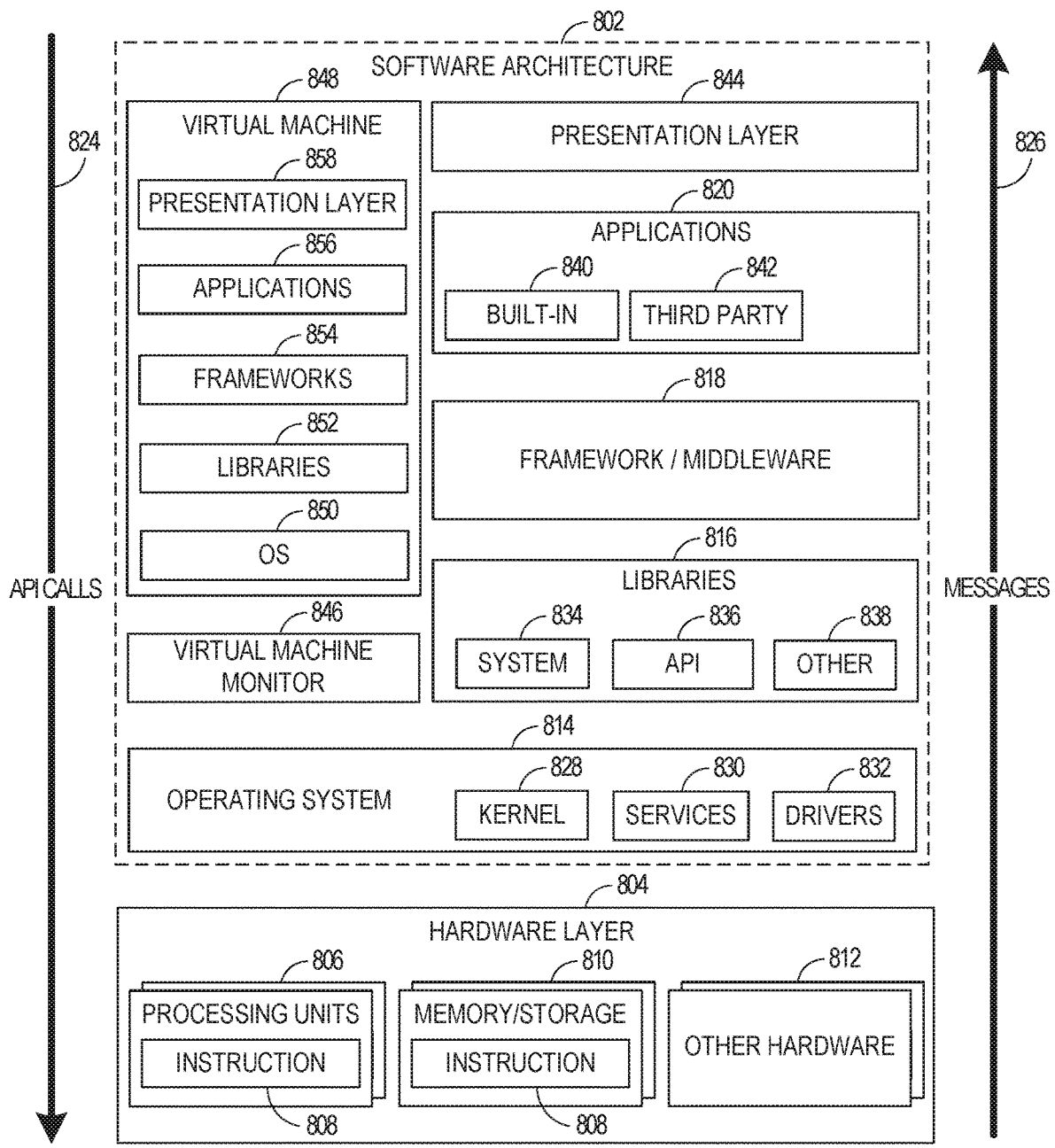
FIG. 8 is a block diagram illustrating a representative software architecture, which may be used in conjunction with various hardware architectures herein described, according to various embodiments of the present disclosure.
Figure 9:
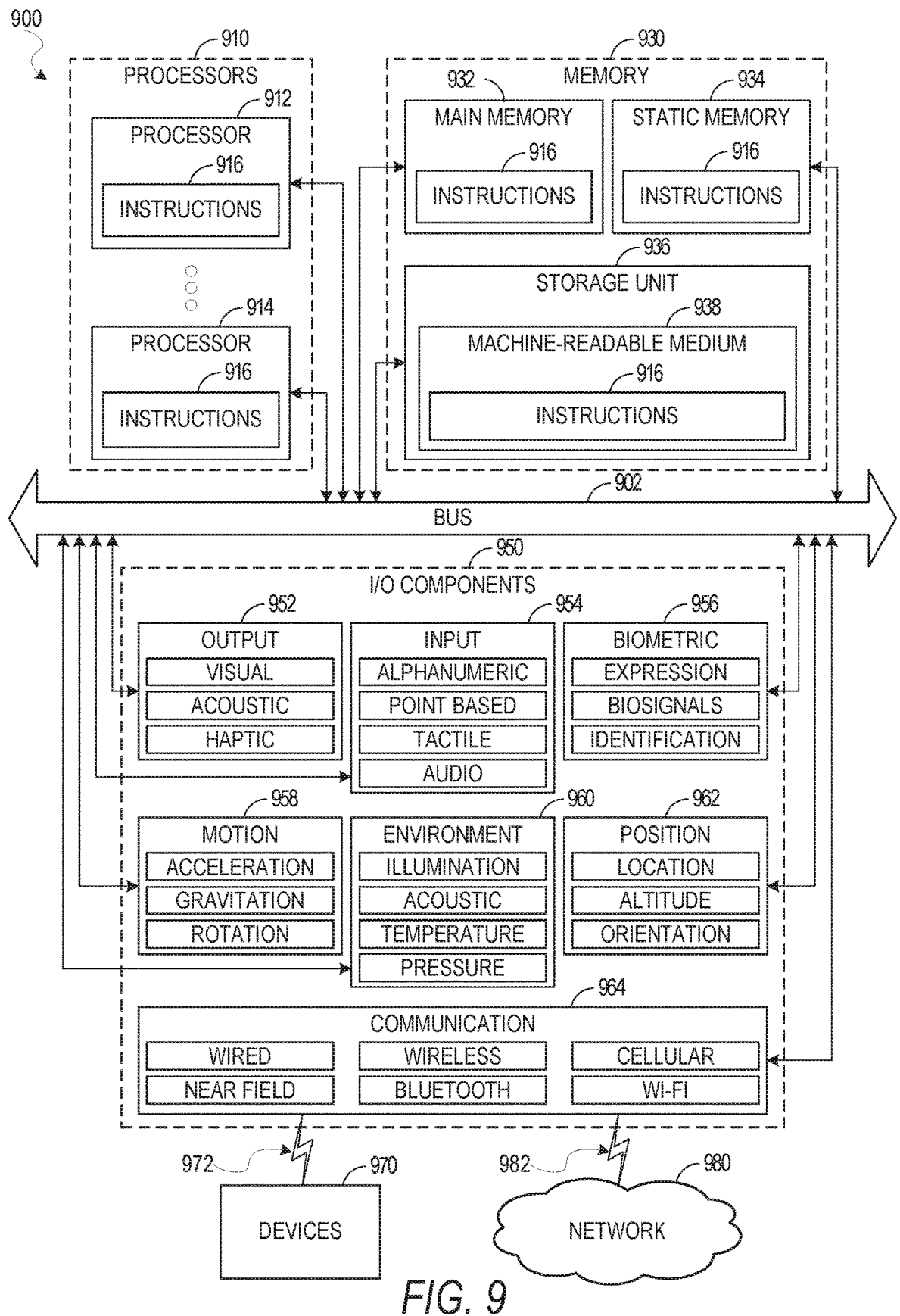
FIG. 9 is a block diagram illustrating components of a machine able to read instructions from a machine storage medium and perform any one or more of the methodologies discussed herein according to various embodiments of the present disclosure.

Various embodiments described herein can be implemented by way of the example software architecture illustrated by and described with respect to FIG. 8 or by way of the example machine illustrated by and described with respect to FIG. 9.

FIG. 8 is a block diagram illustrating an example of a software architecture 802 that can be installed on a machine, according to some example embodiments. FIG. 8 is merely a non-limiting example of a software architecture, and it will be appreciated that many other architectures can be implemented to facilitate the functionality described herein. The software architecture 802 can be executing on hardware such as a machine 900 of FIG. 9 that includes, among other things, processors 910, memory 930, and I/O components 950. A representative hardware layer 804 is illustrated and can represent, for example, the machine 900 of FIG. 9. The representative hardware layer 804 comprises one or more processing units 806 having associated executable instructions 808. The executable instructions 808 represent the executable instructions of the software architecture 802, including implementation of the systems, modules, methods, and so forth of FIG. 3. The hardware layer 804 also includes memory or storage modules 810, which also have the executable instructions 808. The hardware layer 804 can also comprise other hardware 812, which represents any other hardware of the hardware layer 804, such as the other hardware illustrated as part of the machine 900.

In the example architecture of FIG. 8, the software architecture 802 can be conceptualized as a stack of layers, where each layer provides particular functionality. For example, the software architecture 802 can include layers such as an operating system 814, libraries 816, frameworks/middleware 818, applications 820, and a presentation layer 844. Operationally, the applications 820 or other components within the layers can invoke API calls 824 through the software stack and receive a response, returned values, and so forth (illustrated as messages 826) in response to the API calls 824. The layers illustrated are representative in nature, and not all software architectures have all layers. For example, some mobile or special-purpose operating systems may not provide a frameworks/middleware 818 layer, while others may provide such a layer. Other software architectures can include additional or different layers.

The operating system 814 can manage hardware resources and provide common services. The operating system 814 can include, for example, a kernel 828, services 830, and drivers 832. The kernel 828 can act as an abstraction layer between the hardware and the other software layers. For example, the kernel 828 can be responsible for memory management, processor management (e.g., scheduling), component management, networking, security settings, and so on. The services 830 can provide other common services for the other software layers. The drivers 832 can be responsible for controlling or interfacing with the underlying hardware. For instance, the drivers 832 can include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 can provide a common infrastructure that can be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, or drivers 832). The libraries 816 can include system libraries 834 (e.g., C standard library) that can provide functions such as memory allocation functions, string manipulation functions, mathematic functions, and the like. In addition, the libraries 816 can include API libraries 836 such as media libraries (e.g., libraries to support presentation and manipulation of various media formats such as MPEG4, H.264, MP3, AAC, AMR, JPG, and PNG), graphics libraries (e.g., an OpenGL framework that can be used to render 2D and 3D graphic content on a display), database libraries (e.g., SQLite that can provide various relational database functions), web libraries (e.g., WebKit that can provide web browsing functionality), and the like. The libraries 816 can also include a wide variety of other libraries 838 to provide many other APIs to the applications 820 and other software components/modules.

The frameworks 818 (also sometimes referred to as middleware) can provide a higher-level common infrastructure that can be utilized by the applications 820 or other software components/modules. For example, the frameworks/middleware 818 can provide various graphic user interface (GUI) functions, high-level resource management, high-level location services, and so forth. The frameworks/middleware 818 can provide a broad spectrum of other APIs that can be utilized by the applications 820 and/or other software components/modules, some of which can be specific to a particular operating system or platform.

The applications 820 include built-in applications 840 and/or third-party applications 842. Examples of representative built-in applications 840 can include, but are not limited to, a home application, a contacts application, a browser application, a book reader application, a location application, a media application, a messaging application, or a game application.

The third-party applications 842 can include any of the built-in applications 840, as well as a broad assortment of other applications. In a specific example, the third-party applications 842 (e.g., an application developed using the Android™ or iOS™ software development kit (SDK) by an entity other than the vendor of the particular platform) can be mobile software running on a mobile operating system such as iOS™, Android™, Windows® Phone, or other mobile operating systems. In this example, the third-party applications 842 can invoke the API calls 824 provided by the mobile operating system such as the operating system 814 to facilitate functionality described herein.

The applications 820 can utilize built-in operating system functions (e.g., kernel 828, services 830, or drivers 832), libraries (e.g., system libraries 834, API libraries 836, and other libraries 838), or frameworks/middleware 818 to create user interfaces to interact with users of the system. Alternatively, or additionally, in some systems, interactions with a user can occur through a presentation layer, such as the presentation layer 844. In these systems, the application/module "logic" can be separated from the aspects of the application/module that interact with the user.

Some software architectures utilize virtual machines. In the example of FIG. 8, this is illustrated by a virtual machine 848. The virtual machine 848 creates a software environment where applications/modules can execute as if they were executing on a hardware machine (e.g., the machine 900 of FIG. 9). The virtual machine 848 is hosted by a host operating system (e.g., the operating system 814) and typically, although not always, has a virtual machine monitor 846, which manages the operation of the virtual machine 848 as well as the interface with the host operating system (e.g., the operating system 814). A software architecture executes within the virtual machine 848, such as an operating system 850, libraries 852, frameworks/middleware 854, applications 856, or a presentation layer 858. These layers of software architecture executing within the virtual machine 848 can be the same as corresponding layers previously described or may be different.

FIG. 9 illustrates a diagrammatic representation of a machine 900 in the form of a computer system within which a set of instructions can be executed for causing the machine 900 to perform any one or more of the methodologies discussed herein, according to an embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. For example, the instructions 916 can cause the machine 900 to execute the method 300 of FIG. 3. The instructions 916 transform the general, non-programmed machine 900 into a particular machine 900 programmed to carry out the described and illustrated functions in the manner described. In alternative embodiments, the machine 900 operates as a standalone device or can be coupled (e.g., networked) to other machines. In a networked deployment, the machine 900 can operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 can include processors 910, memory 930, and I/O components 950, which can be configured to communicate with each other such as via a bus 902. In an embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) can include, for example, a processor 912 and a processor 914 that can execute the instructions 916. The term "processor" is intended to include multi-core processors that can comprise two or more independent processors (sometimes referred to as "cores") that can execute instructions contemporaneously. Although FIG. 9 shows multiple processors 910, the machine 900 can include a single processor with a single core, a single processor with multiple cores (e.g., a multi-core processor), multiple processors with a single core, multiple processors with multiples cores, or any combination thereof.

The memory 930 can include a main memory 932, a static memory 934, and a storage unit 936 including machine-readable medium 938, each accessible to the processors 910 such as via the bus 902. The main memory 932, the static memory 934, and the storage unit 936 store the instructions 916 embodying any one or more of the methodologies or functions described herein. The instructions 916 can also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 can include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 can include many other components that are not shown in FIG. 9. The I/O components 950 are grouped according to functionality merely for simplifying the following discussion, and the grouping is in no way limiting. In various embodiments, the I/O components 950 can include output components 952 and input components 954. The output components 952 can include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 950 can include biometric components 956, motion components 958, environmental components 960, or position components 962, among a wide array of other components. For example, the biometric components 956 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 can include acceleration sensor components (e.g., accelerometer), gravitation sensor components, rotation sensor components (e.g., gyroscope), and so forth. The environmental components 960 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 962 can include location sensor components (e.g., a Global Positioning System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 950 can include communication components 964 operable to couple the machine 900 to a network 980 or devices 970 via a coupling 982 and a coupling 972, respectively. For example, the communication components 964 can include a network interface component or another suitable device to interface with the network 980. In further examples, the communication components 964 can include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 can be another machine or any of a wide variety of peripheral devices (e.g., a peripheral device coupled via a USB).

Moreover, the communication components 964 can detect identifiers or include components operable to detect identifiers. For example, the communication components 964 can include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 964, such as location via Internet Protocol (IP) geolocation, location via Wi-Fi® signal triangulation, location via detecting an NFC beacon signal that can indicate a particular location, and so forth.

Executable Instructions and Machine Storage Medium

The various memories (i.e., 930, 932, 934, and/or the memory of the processor(s) 910) and/or the storage unit 936 can store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and can be used interchangeably. The terms refer to a single or multiple storage devices and/or media (e.g., a centralized or distributed database, and/or associated caches and servers) that store executable instructions 916 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 980 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 can include a wireless or cellular network, and the coupling 982 can be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 can be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 can be transmitted or received using a transmission medium via the coupling 972 (e.g., a peer-to-peer coupling) to the devices 970. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

In view of the disclosure above, various examples are set forth below. It should be noted that one or more features of an example, taken in isolation or combination, should be considered within the disclosure of this application.

EXAMPLES

Example 1 is a method comprising: accessing, by one or more hardware processors, video data generated by a digital image capture device, where the video data comprises a series of frames of video captured by the digital image capture device; capturing, by one or more hardware processors, pixels from a region of interest in each frame in the series of frames; generating, by one or more hardware processors, a composite image based on the pixels; and processing the composite image by a computer vision technique to detect a set of moving objects in the composite image.

In Example 2, the subject matter of Example 1 optionally includes where the region of interest is defined as a line or a vector.

In Example 3, the subject matter of Example 1 or Example 2 optionally includes where the region of interest is defined by a user through a user interface.

In Example 4, the subject matter of any one of Example 1 through Example 3 optionally includes where the series of frames corresponds to a range of time, and wherein a dimension of the composite image corresponds to the range of time.

In Example 5, the subject matter of any one of Example 1 through Example 4 optionally includes where a dimension of an individual moving object, on the composite image, infers speed of the individual moving object, the individual moving object being included by the set of moving objects.

In Example 6, the subject matter of any one of Example 1 through Example 5 optionally includes where the generating of the composite image based on the captured pixels comprises appending the pixels together according to an order in which the pixels are captured from the series of frames.

In Example 7, the subject matter of any one of Example 1 through Example 6 optionally includes where the computer vision technique comprises a machine learning model.

In Example 8, the subject matter of any one of Example 1 through Example 7 optionally includes where the machine learning model is trained to detect moving objects within composite images.

In Example 9, the subject matter of any one of Example 1 through Example 8 optionally includes where the machine learning model is trained based on training data generated using a three-dimensional rendering framework.

In Example 10, the subject matter of any one of Example 1 through Example 9 optionally includes where at least one in the set of moving objects is at least one of a person or a vehicle.

In Example 11, the subject matter of any one of Example 1 through Example 10 optionally includes where the operations comprise, based on the detecting of the set of moving objects in the composite image, determining a count of moving objects passing through the region of interest.

In Example 12, the subject matter of any one of Example 1 through Example 11 optionally includes where the region of interest is positioned within each frame relative to a gated path depicted in the video, and where the operations comprise, based on the detecting of the set of moving objects in the composite image, determining when a first moving object in the set of moving objects gains unauthorized passage through the gated path by following a second moving object in the set of moving objects through the gated path.

In Example 13, the subject matter of any one of Example 1 through Example 12 optionally includes where the second moving object has authorized passage through the gated path.

In Example 14, the subject matter of any one of Example 1 through Example 13 optionally includes where the region of interest is positioned within each frame relative to a gate system depicted in the video, and where the operations comprise: accessing system information from the gate system; and based on the system information and the detecting of the set of moving objects in the composite image, determining when a first moving object in the set of moving objects gains unauthorized passage through the gated system by following a second moving object in the set of moving objects through the gated system.

In Example 15, the subject matter of any one of Example 1 through Example 14 optionally includes where the system information describes at least one of when the gate system is open or when the gate system is closed.

In Example 16, the subject matter of any one of Example 1 through Example 15 optionally includes where the region of interest is positioned within each frame relative to a gate depicted in the video.

In Example 17, the subject matter of any one of Example 1 through Example 16 optionally includes where the operations comprise storing the composite image as historical data for the video.

In Example 18, the subject matter of any one of Example 1 through Example 17 optionally includes where the operations comprise causing the composite image to display on a client device on a client interface.

In Example 19, the subject matter of any one of Example 1 through Example 18 optionally includes where the operations comprise at least one of storing the composite image, as historical data, in place of the video, or causing the composite image to display, in place of the video, on a client device on a client interface.

Example 20 is a system comprising: a data source for providing video data generated by a digital image capture device; a memory storing instructions; and one or more hardware processors communicatively coupled to the memory and configured by the instructions to perform operations in accordance with any of Examples 1 through 19.

Example 21 is a non-transitory computer storage medium comprising instructions that, when executed by a hardware processor of a device, cause the device to perform operations in accordance with any of Examples 1 through 19.

What is claimed is:

1. At least one non-transitory computer-readable storage medium comprising instructions that are operable, when executed by one or more computers, to cause the one or more computers to perform operations comprising:

maintaining region of interest data that identifies a region of interest for frames captured by a digital image capture device;

accessing video data that comprises a series of frames captured by the digital image capture device during a time period;

extracting, from each of two or more frames from the series of frames and using the region of interest data, pixel data for a region in the respective frame defined by the region of interest;

generating, using the pixel data, a composite image i) for the time period and ii) that has a dimension defined by a duration of the time period, the generating comprising appending subsequent pixel data for a subsequent frame to prior pixel data for a prior frame according to an order in which the frames in the series of frames were captured during the time period; and storing, in memory, the composite image for analysis of one or more moving objects depicted in the composite image.

2. The non-transitory computer-readable storage medium of claim 1, wherein the region is positioned within each frame from the series of frames relative to a gate depicted in the frames, the operations comprising:

determining, using the composite image, whether a first moving object in the one or more moving objects gains unauthorized passage through the gate by following a second moving object in the one or more moving objects through the gate; and performing one or more operations using a result of the determination whether the first moving object in the one or more moving objects gains unauthorized passage through the gate by following the second moving object in the one or more moving objects through the gate.

3. The non-transitory computer-readable storage medium of claim 2, wherein determining whether the first moving object in the one or more moving objects gains unauthorized passage through the gate by following the second moving object in the one or more moving objects through the gate uses system information that describes at least one of when the gate is open or when the gate is closed.

4. The non-transitory computer-readable storage medium of claim 1, the operations comprising:

based on storing the composite image, determining to discard the video data.

5. The non-transitory computer-readable storage medium of claim 1, the operations comprising determining the dimension using the region of interest and the duration of the time period.

6. The non-transitory computer-readable storage medium of claim 1, wherein a second dimension for the composite image that is perpendicular the dimension has the same size as a corresponding dimension from the frames in the series of frames.

7. The non-transitory computer-readable storage medium of claim 1, wherein a size of a moving object from the one or more moving objects depicted in the composite image represents a speed at which the moving object was moving when the digital image capture device captured at least some frames from the series of frames.

8. The non-transitory computer-readable storage medium of claim 1, wherein:

the region of interest comprises a line; and extracting the pixel data for the region in the respective frame comprises extracting a scan line for the region in the respective frame.

9. The non-transitory computer-readable storage medium of claim 1, wherein the dimension is substantially parallel to a movement direction of at least one object from the moving objects.

10. A method comprising:
maintaining region of interest data that identifies a region of interest for frames captured by a digital image capture device;
accessing video data that comprises a series of frames captured by the digital image capture device during a time period;
extracting, from each of two or more frames from the series of frames and using the region of interest data, pixel data for a region in the respective frame defined by the region of interest;
generating, using the pixel data, a composite image i) for the time period and ii) that has a dimension defined by a duration of the time period, the generating comprising appending subsequent pixel data for a subsequent frame to prior pixel data for a prior frame according to an order in which the frames in the series of frames were captured during the time period; and
storing, in memory, the composite image for analysis of one or more moving objects depicted in the composite image.

11. The method of claim 10, wherein the region is positioned within each frame from the series of frames relative to a gate depicted in the frames, the method comprising:
determining, using the composite image, whether a first moving object in the one or more moving objects gains unauthorized passage through the gate by following a second moving object in the one or more moving objects through the gate; and
performing one or more operations using a result of the determination whether the first moving object in the one or more moving objects gains unauthorized passage through the gate by following the second moving object in the one or more moving objects through the gate.

12. The method of claim 11, wherein determining whether the first moving object in the one or more moving objects gains unauthorized passage through the gate by following the second moving object in the one or more moving objects through the gate uses system information that describes at least one of when the gate is open or when the gate is closed.

13. The method of claim 10, comprising:
based on storing the composite image, determining to discard the video data.

14. The method of claim 10, comprising determining the dimension using the region of interest and the duration of the time period.

15. The method of claim 10, wherein a second dimension for the composite image that is perpendicular the dimension has the same size as a corresponding dimension from the frames in the series of frames.

16. The method of claim 10, wherein a size of a moving object from the one or more moving objects depicted in the composite image represents a speed at which the moving object was moving when the digital image capture device captured at least some frames from the series of frames.

17. The method of claim 10, wherein:
the region of interest comprises a line; and
extracting the pixel data for the region in the respective frame comprises extracting a scan line for the region in the respective frame.

18. A system comprising one or more computers and one or more storage devices on which are stored instructions that are operable, when executed by the one or more computers, to cause the one or more computers to perform operations comprising:
maintaining region of interest data that identifies a region of interest for frames captured by a digital image capture device;
accessing video data that comprises a series of frames captured by the digital image capture device during a time period;
extracting, from each of two or more frames from the series of frames and using the region of interest data, pixel data for a region in the respective frame defined by the region of interest;
generating, using the pixel data, a composite image i) for the time period and ii) that has a dimension defined by a duration of the time period, the generating comprising appending subsequent pixel data for a subsequent frame to prior pixel data for a prior frame according to an order in which the frames in the series of frames were captured during the time period; and
storing, in memory, the composite image for analysis of one or more moving objects depicted in the composite image.

19. The system of claim 18, wherein a size of a moving object from the one or more moving objects depicted in the composite image represents a speed at which the moving object was moving when the digital image capture device captured at least some frames from the series of frames.

20. The system of claim 18, wherein the dimension is substantially parallel to a movement direction of at least one object from the moving objects.

* * * * *

UNITED STATES PATENT AND TRADEMARK OFFICE
CERTIFICATE OF CORRECTION

| | | |
|---|---|---|
| PATENT NO. | : 12,051,242 B2 | Page 1 of 1 |
| APPLICATION NO. | : 17/452668 | |
| DATED | : July 30, 2024 | |
| INVENTOR(S) | : Ariel Amato et al. | |

It is certified that error appears in the above-identified patent and that said Letters Patent is hereby corrected as shown below:

On the Title Page

Column 1, item (72) Inventors:, 3rd inventor, change "Asencio" to --Asensio--.

Signed and Sealed this
Twenty-second Day of July, 2025

Coke Morgan Stewart
*Acting Director of the United States Patent and Trademark Office*